(12) United States Patent
Shibata et al.

(10) Patent No.: US 8,171,781 B2
(45) Date of Patent: May 8, 2012

(54) ABNORMALITY DIAGNOSIS APPARATUS AND ABNORMALITY DIAGNOSIS METHOD FOR NOX CATALYST

(75) Inventors: Daisuke Shibata, Numazu (JP); Hiroshi Sawada, Gotenba (JP); Toru Kidokoro, Hadano (JP)

(73) Assignee: Toyota Jidosha Kabushiki Kaisha, Aichi (JP)

(*) Notice: Subject to any disclaimer, the term of this patent is extended or adjusted under 35 U.S.C. 154(b) by 152 days.

(21) Appl. No.: 12/747,409

(22) PCT Filed: Jun. 11, 2008

(86) PCT No.: PCT/JP2008/061064
§ 371 (c)(1),
(2), (4) Date: Jun. 10, 2010

(87) PCT Pub. No.: WO2009/150752
PCT Pub. Date: Dec. 17, 2009

(65) Prior Publication Data
US 2010/0257922 A1    Oct. 14, 2010

(51) Int. Cl.
*G01M 15/10* (2006.01)
(52) U.S. Cl. .................................................. 73/114.75
(58) Field of Classification Search ............... 73/114.69, 73/114.71, 114.75
See application file for complete search history.

(56) References Cited

U.S. PATENT DOCUMENTS

| 5,765,370 | A | | 6/1998 | Hanafusa et al. |
| 5,865,027 | A | * | 2/1999 | Hanafusa et al. ............... 60/277 |
| 5,979,161 | A | * | 11/1999 | Hanafusa et al. ............... 60/277 |
| 6,082,101 | A | | 7/2000 | Manaka et al. |
| 6,898,927 | B2 | * | 5/2005 | Morinaga et al. ............... 60/284 |
| 2003/0070423 | A1 | | 4/2003 | Morinaga et al. |

FOREIGN PATENT DOCUMENTS

| JP | 07-026944 A | 1/1995 |
| JP | 08-338297 A | 12/1996 |
| JP | 10-037741 A | 2/1998 |
| JP | 11-093647 A | 4/1999 |
| JP | 11-117726 A | 4/1999 |
| JP | 2000-314308 A | 11/2000 |
| JP | 2003-120382 A | 4/2003 |
| JP | 2003-214153 A | 7/2003 |
| JP | 2003-314258 A | 11/2003 |

\* cited by examiner

*Primary Examiner* — Freddie Kirkland, III
(74) *Attorney, Agent, or Firm* — Sughrue Mion, PLLC

(57) ABSTRACT

An abnormality diagnosis apparatus for an NOx catalyst of the present invention measures an index value (R) regarding an NOx clarification capacity of an NOx catalyst and determines an abnormality of the NOx catalyst based on index values (R1, R2) respectively measured at a timing (Tc1) at which the NOx catalyst has a relatively-low activation level and a timing (Tc2) at which the NOx catalyst has a relatively-high activation level. Since the index value at the timing at which the NOx catalyst has a relatively-low activation level (i.e., a timing at which the NOx catalyst originally does not have a sufficient NOx clarification capacity) is used, the abnormality diagnosis for the NOx catalyst can be carried out without intentionally deteriorating emission.

12 Claims, 5 Drawing Sheets

ABNORMALITY DIAGNOSIS APPARATUS AND ABNORMALITY DIAGNOSIS METHOD FOR NOX CATALYST

CROSS REFERENCE TO RELATED APPLICATION

This application is a National Stage of International Application No. PCT/JP2008/061064 filed Jun. 11, 2008, the contents of which is incorporated herein by reference in its entirety.

TECHNICAL FIELD

The present invention relates to an apparatus and a method for an abnormality diagnosis of NOx catalyst provided in an exhaust passage of an internal-combustion engine.

BACKGROUND ART

Generally, as an exhaust clarification apparatus provided in an exhaust system of an internal-combustion engine such as a diesel engine, NOx catalyst has been known to clarify NOx (nitrogen oxide) included in exhaust gas. On the other hand, when NOx catalyst has an abnormality such as deterioration or failure, the NOx clarification capacity is deteriorated to thereby cause a situation where NOx is emitted to air in a greater amount than in a normal case. To prevent this, diagnosis of an abnormality of NOx catalyst has been carried out. In particular, in the case of an engine mounted in an automobile, there has been a demand for carrying out a catalyst abnormality diagnosis in an on-board status.

For example, Japanese Patent Application Laid-Open No. H11-93647 (1999) discloses a deterioration diagnosis apparatus for a selective reduction NOx catalyst reducing NOx when reducing agent is supplied. According to this, a catalyst downstream-side NOx concentration when reducing agent is supplied to NOx catalyst and a catalyst downstream-side NOx concentration when reducing agent is not supplied to the NOx catalyst are detected. Based on these NOx concentrations, the catalyst deterioration is diagnosed.

Japanese Patent Application Laid-Open No. 2003-214153 discloses a technique to add reducing agent when NOx storage reduction catalyst reaches a light off determination temperature and a deterioration of the NOx catalyst is determined based on a temperature difference between exhaust gases of the catalyst upstream and the catalyst downstream. Japanese Patent Application Laid-Open No. H7-26944 (1995) discloses a technique to compare a catalyst deterioration determination criterion depending on an engine operation status with a deterioration level calculated based on a catalyst temperature to determine the catalyst deterioration.

By the way, in the apparatus disclosed in Japanese Patent Application Laid-Open No. H11-93647 (1999), there is a problem where emission is deteriorated during a diagnosis of NOx catalyst deterioration. Specifically, this technique intentionally causes a status where no reducing agent is supplied in order to perform a diagnosis of NOx catalyst deterioration. This prevents NOx catalyst from reducing NOx while no reducing agent being supplied, thus causing the emission of NOx.

In view of the above, it is an objective of the present invention to provide an abnormality diagnosis apparatus and an abnormality diagnosis method for NOx catalyst by which the emission during the abnormality diagnosis can be prevented from being deteriorated.

DISCLOSURE OF THE INVENTION

In order to achieve the above objective, according to the first embodiment of the present invention, there is provided an abnormality diagnosis apparatus for an NOx catalyst, characterized in comprising:

NOx catalyst provided in an exhaust passage of an internal-combustion engine;

measurement means for measuring an index value regarding an NOx clarification capacity of the NOx catalyst; and abnormality determination means for determining an abnormality of the NOx catalyst based on an index value measured by the measurement means at a timing at which the NOx catalyst has a relatively-low activation level and an index value measured by the measurement means at a timing at which the NOx catalyst has a relatively-high activation level.

Between a timing at which the NOx catalyst has a relatively-low activation level and a timing at which the NOx catalyst has a relatively-high activation level, there is a difference or change in the NOx clarification capacity of the NOx catalyst. The difference or change amount changes depending on the deterioration level of the NOx catalyst. Thus, by measuring an index value regarding the NOx clarification capacity of the NOx catalyst at both of the timings to determine the difference or the magnitude of the change amount of these index values, whether the NOx catalyst is normal or abnormal can be determined. In particular, such an index value is used that is measured at the timing at which the NOx catalyst has a relatively-low activation level (in other words, at a timing at which the catalyst temperature does not still sufficiently reach an active temperature range). At such a timing, the NOx catalyst originally does not have a sufficient NOx clarification capacity. Thus, by using the index value measured at this timing, the need as in Japanese Patent Application Laid-Open No. H11-93647 (1999) for example can be avoided where a status having a low NOx clarification capacity is intentionally created in spite of the fact that the NOx catalyst has a high activation level. Thus, an abnormality diagnosis for the NOx catalyst can be carried out without intentionally deteriorating the emission.

The second embodiment of the present invention is characterized in that, in the first embodiment, the timing at which the NOx catalyst has a relatively-low activation level consists of a first timing, the timing at which the NOx catalyst has a relatively-high activation level consists of a second timing having a higher catalyst activation level than that of the first timing and a third timing having a higher catalyst activation level than that of the second timing, and the abnormality determination means determines, when a change amount between an index value measured at the first timing and an index value measured at the second timing is equal to or lower than a predetermined value, an abnormality of the NOx catalyst based on a change amount between the index value measured at the first timing and an index value measured at the third timing.

The third embodiment of the present invention is characterized in further comprising, in the second embodiment, catalyst temperature estimation means for estimating a catalyst temperature of the NOx catalyst; and reducing agent addition control means for controlling an addition of reducing agent to the NOx catalyst based on the catalyst temperature estimated by the catalyst temperature estimation means, wherein, the reducing agent addition control means changes, when the change amount between the index value measured at the first timing and the index value measured at the second timing is larger than a predetermined value, a catalyst temperature for starting the addition of the reducing agent to a lower-temperature side.

The fourth embodiment of the present invention is characterized in that, in the third embodiment, the reducing agent addition control means changes, when a change amount between the index value measured at the first timing and an index value measured at the third timing is larger than a predetermined value, a catalyst temperature for starting the addition of the reducing agent to a higher-temperature side.

The fifth embodiment of the present invention is characterized in that, in any embodiment of the first to fourth embodiments, the timing at which the NOx catalyst has a relatively-low activation level is a timing at which a catalyst temperature is lower than an activation start temperature and the timing at which the NOx catalyst has a relatively-high activation level is a timing at which the catalyst temperature is equal to or higher than the activation start temperature.

The sixth embodiment of the present invention is characterized in that, in the second embodiment, the first timing is a timing at which a catalyst temperature is lower than an activation start temperature, the second timing is a timing at which the catalyst temperature is equal to or higher than the activation start temperature and is lower than an activation completed temperature, and the third timing is a timing at which the catalyst temperature is equal to or higher than the activation completed temperature.

The seventh embodiment of the present invention is characterized in that, in any embodiment of the first to sixth embodiments, the index value is an NOx clarification rate.

According to the eighth embodiment of the present invention, there is provided a method for diagnosing an abnormality of NOx catalyst provided in an exhaust passage of an internal-combustion engine, comprising:

a step of measuring an index value regarding a clarification capacity of the NOx catalyst at a timing at which the NOx catalyst has a relatively-low activation level;

a step of measuring the index value at a timing at which the NOx catalyst has a relatively-high activation level; and a step of determining an abnormality of the NOx catalyst based on these measured index values.

The ninth embodiment of the present invention is characterized in that, in the eighth embodiment, the timing at which the NOx catalyst has a relatively-low activation level consists of a first timing, the timing at which the NOx catalyst has a relatively-high activation level consists of a second timing having a higher catalyst activation level than that of the first timing and a third timing having a higher catalyst activation level than that of the second timing, and the abnormality determination step determines, when a change amount between an index value measured at the first timing and an index value measured at the second timing is equal to or lower than a predetermined value, an abnormality of the NOx catalyst based on a change amount between the index value measured at the first timing and an index value measured at the third timing.

The tenth embodiment of the present invention is characterized in further comprising, in the ninth embodiment, a step of estimating a catalyst temperature of the NOx catalyst; and a step of controlling an addition of reducing agent to the NOx catalyst based on this estimated catalyst temperature, wherein, the reducing agent addition control step changes, when the change amount between the index value measured at the first timing and the index value measured at the second timing is larger than a predetermined value, a catalyst temperature for starting the addition of the reducing agent to a lower-temperature side.

The eleventh embodiment of the present invention is characterized in that, in the tenth embodiment, the reducing agent addition control step includes changing, when a change amount between the index value measured at the first timing and an index value measured at the third timing is larger than a predetermined value, a catalyst temperature for starting the addition of the reducing agent to a higher-temperature side.

The twelfth embodiment of the present invention is characterized in that, in any of the eighth to eleventh embodiments, the timing at which the NOx catalyst has a relatively-low activation level is a timing at which a catalyst temperature is lower than an activation start temperature and the timing at which the NOx catalyst has a relatively-high activation level is a timing at which the catalyst temperature is equal to or higher than the activation start temperature.

The thirteenth embodiment of the present invention is characterized in that, in the ninth embodiments, the first timing is a timing at which a catalyst temperature is lower than an activation start temperature, the second timing is a timing at which the catalyst temperature is equal to or higher than the activation start temperature and is lower than an activation completed temperature, and the third timing is a timing at which the catalyst temperature is equal to or higher than the activation completed temperature.

The fourteenth embodiment of the present invention is characterized in that, in any of the eighth to thirteenth embodiments, the index value shows an NOx clarification rate.

According to the present invention, such an advantageous effect is provided that an abnormality diagnosis apparatus and an abnormality diagnosis method for an NOx catalyst can be provided by which the deterioration of emission during abnormality diagnosis can be avoided.

BRIEF DESCRIPTION OF THE DRAWINGS

FIG. 3(A) shows a case where an estimated catalyst temperature is equal to a true catalyst temperature, FIG. 3 (B) shows a case where an estimated catalyst temperature is lower than a true catalyst temperature, and FIG. 3(C) shows a case where an estimated catalyst temperature is higher than a true catalyst temperature;

BEST MODE FOR CARRYING OUT THE INVENTION

The following section will describe the best mode for carrying out the present invention with reference to the drawings.

Figure 1:
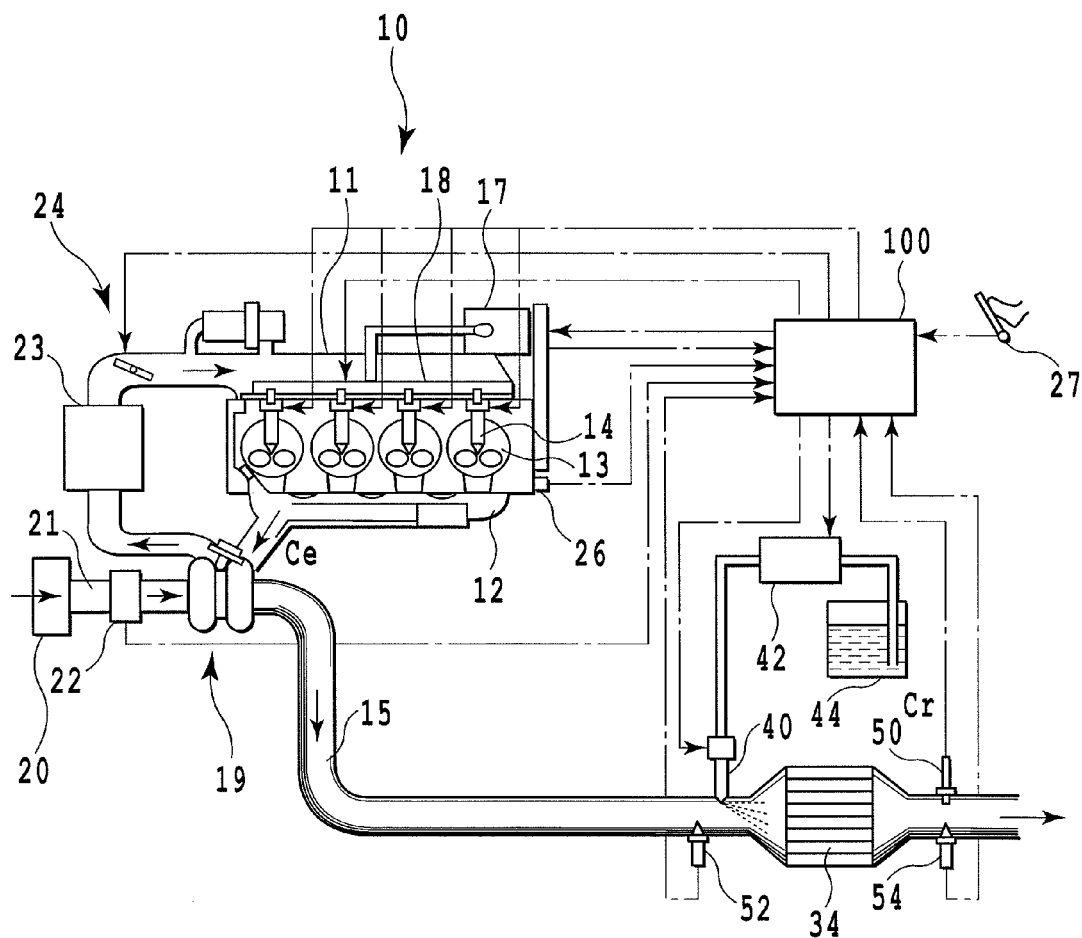
FIG. 1 is a schematic system diagram illustrating an internal-combustion engine according to an embodiment of the present invention.

FIG. 1 is a schematic system diagram illustrating an internal-combustion engine according to an embodiment of the present invention. In the drawing, the reference numeral 10 denotes a compression ignition-type internal-combustion engine (i.e., diesel engine) for automobiles, the reference numeral 11 denotes an intake manifold communicating with an intake port, the reference numeral 12 denotes an exhaust manifold communicating with an exhaust port, and the reference numeral 13 denotes a combustion chamber. In this embodiment, fuel supplied from a not-shown fuel tank to a high pressure pump 17 is sent in a pressurized manner by the high pressure pump 17 to a common rail 18 and is accumulated while having a high pressure. This high pressure fuel in the common rail 18 is directly injected and supplied from an injector 14 into the combustion chamber 13. The exhaust gas from an engine 10 is sent from the exhaust manifold 12 through a turbo charger 9 and then flows to an exhaust passage 15 at the downstream thereof. Then, the exhaust gas is subjected to a clarification processing as described later and is then emitted to air. It is noted that an embodiment of a diesel engine is not limited to the one including a common rail-type fuel injection apparatus. Alternatively, other exhaust clarification device including an EGR apparatus also may be arbitrarily included.

On the other hand, the intake air introduced from an air cleaner 20 to the interior of an intake passage 21 sequentially passes through an airflow meter 22, a turbo charger 19, an intercooler 23, and a throttle valve 24 to reach an intake manifold 11. The airflow meter 22 is a sensor for detecting an intake air amount that specifically outputs a signal depending on the flow rate of the intake air. The throttle valve 24 is the electronically-controlled one.

The exhaust passage 15 includes NOx catalyst 34 that reduces NOx included in the exhaust gas in the passage to clarify NOx. The NOx catalyst 34 of this embodiment is selective reduction NOx catalyst that may, when reducing agent is added thereto, continuously reduce NOx.

At the exhaust passage 15 at the upstream-side of the NOx catalyst 34, there is provided an addition valve 40 for selectively adding to the NOx catalyst 34 reducing agent of urea. Urea is used in the form of urea aqueous solution and is supplied and injected into the exhaust passage 15 from the addition valve 40 to the NOx catalyst 34 at the downstream side. The addition valve 40 is connected to a supply apparatus 42 for supplying urea aqueous solution thereto. The supply apparatus 42 is connected to a tank 44 for storing urea aqueous solution.

There is also provided an electronic control unit (hereinafter referred to as ECU) 100 as control means for controlling the entire engine. The ECU 100 includes CPU, ROM, RAM, an input/output port, and a storage apparatus for example. The ECU 100 controls, based on detection values for example of various sensors or the like, the injector 14, the high pressure pump 17, and the throttle valve 24 for example so that a desired engine control is carried out. The ECU 100 also controls the addition valve 40 and the supply apparatus 42 so as to control the urea addition amount. Sensors or the like connected to the ECU 100 include, in addition to the above-described airflow meter 22, an NOx sensor provided at the downstream side of the NOx catalyst 34 (i.e., a post catalyst NOx sensor 50) and a pre catalyst exhaust temperature sensor 52 and a post catalyst exhaust temperature sensor 54 provided at the upstream-side and the downstream side of the NOx catalyst 34, respectively. The post catalyst NOx sensor 50 outputs, to the ECU 100, a signal depending on the NOx concentration of the exhaust gas at a position where the post catalyst NOx sensor 50 is placed (i.e., a post catalyst NOx concentration). The pre catalyst exhaust temperature sensor 52 and the post catalyst exhaust temperature sensor 54 output, to the ECU 100, signals depending on the temperatures of exhaust gases at positions where the pre catalyst exhaust temperature sensor 52 and the post catalyst exhaust temperature sensor 54 are placed.

As other sensors or the like, a crank angle sensor 26 and an accelerator opening sensor 27 are connected to the ECU 100. The crank angle sensor 26 outputs a crank pulse signal to the ECU 100 during the rotation of a crank angle. Based on the crank pulse signal, the ECU 100 detects the crank angle of the engine 10 and calculates the rotation speed of the engine 10. The accelerator opening sensor 27 outputs, to the ECU 100, a signal depending on the opening of the accelerator pedal operated by a user (accelerator opening).

The selective reduction NOx catalyst (SCR: Selective Catalyst Reduction) 34 exemplarily include, for example, the one in which the surface of base material such as zeolite or alumina supports a noble metal such as Pt, the one in which the surface of the base material supports a transition metal such as Cu by ion exchange, and the one in which the surface of the base material supports titania/vanadium catalyst ($V_2O_5/WO_3/TiO_2$). The selective reduction the NOx catalyst 34 has a catalyst temperature (catalyst bed temperature) in an active temperature range and reduces and clarifies NOx when reducing agent of urea is being added thereto. When urea is added to the catalyst, ammonia is generated on catalyst and this ammonia reacts with NOx to thereby reduce NOx.

An amount of urea added to the NOx catalyst 34 is controlled by the ECU 100 based on the post catalyst NOx concentration detected by the post catalyst NOx sensor 50. Specifically, the urea injection amount from the addition valve 40 is controlled so that the post catalyst NOx concentration always has a detection value of zero. In this case, the urea injection amount may be set only based on the detection value of the post catalyst NOx concentration or a basic urea injection amount based on an engine operation status (e.g., an engine rotation speed and an accelerator opening) also may be subjected to a feedback compensation based on the detection value from the post catalyst NOx sensor 50. Since the NOx catalyst 34 can reduce NOx only when urea is being added thereto, urea is generally always added thereto. A control is also provided so that only the minimum amount of urea required to reduce NOx emitted from the engine is added to the NOx catalyst 34. An addition of an excessive amount of urea causes ammonia to be emitted to the downstream of the catalyst (so-called $NH_3$ slip), which causes abnormal odor for example.

When assuming that the minimum urea amount required to reduce the total amount of NOx emitted from the engine is A and an amount of actually-added urea is B, a ratio therebetween of B/A is called an equivalent ratio. Although an urea addition control is carried out so that the equivalent ratio is close to 1 as much as possible, an actual equivalent ratio is not always because the engine operation status actually changes momentarily. The equivalent ratio smaller than 1 shows an insufficient urea supply amount which causes NOx to be emitted to the downstream side of the catalyst. Thus, this is sensed by the post catalyst NOx sensor 50 so that a supply amount of urea is increased. The equivalent ratio larger than 1 causes an excessive urea supply amount. There also may be a case where added urea is attached to the NOx catalyst 34. In this case, even when urea addition is stopped, the attached urea can provide NOx reduction for a certain period of time.

Although the temperature of the NOx catalyst 34 also can be directly detected by a temperature sensor buried in the catalyst, this is estimated in this embodiment. Specifically, the ECU 100 estimates a catalyst temperature based on the pre catalyst exhaust temperature and the post catalyst exhaust temperature detected by the pre catalyst exhaust temperature sensor 52 and the post catalyst exhaust temperature sensor 54, respectively.

Figure 2:
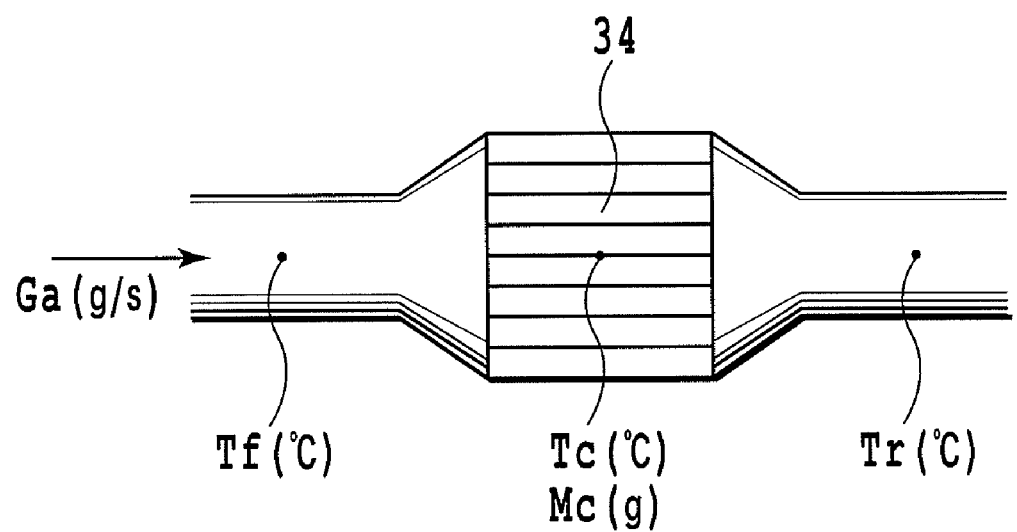
FIG. 2 is a reference diagram for explaining an estimation method of a catalyst temperature.

An estimation method of a catalyst temperature will be described with reference to FIG. 2. It is assumed that the catalyst upstream-side exhaust gas flowing into the NOx catalyst 34 has a temperature Tf (degrees C.) and a gas amount of the exhaust gas is Ga (g/s). Since the gas amount of the exhaust gas may be considered to be equal to the amount air sucked into the engine, the intake air amount Ga is assumed as an exhaust gas amount. This exhaust gas amount is an amount of exhaust gas flowing into the catalyst per a unit time (per one second in this case). On the other hand, it is assumed that the NOx catalyst 34 has a catalyst temperature Tc (degrees C.) and the NOx catalyst 34 has a weight Mc (g). It is assumed that the catalyst downstream-side exhaust gas emitted from the NOx catalyst 34 has a temperature Tr (degrees C.).

It is assumed that the catalyst upstream-side exhaust gas has thermal energy Ef and the NOx catalyst 34 has thermal energy Ec. These thermal energies Ef and Ec can be represented by the following formulae (1) and (2) in which Cg shows a specific heat ratio of the exhaust gas and Cc shows a specific heat ratio of the NOx catalyst 34 both of which have a fixed value.

$$Ef = Ga \times Tf \times Cg (J/s) \quad (1)$$

$$Ec = Mc \times Tc \times Cc (J) \quad (2)$$

By the way, thermal equilibrium is considered in the case where the exhaust gas having thermal energy Ef is supplied to the NOx catalyst 34 having thermal energy Ec. It is assumed that the NOx catalyst 34 and the exhaust gas reach a thermal equilibrium status after a unit time has passed since the start of the supply of the exhaust gas and the temperatures of both of the NOx catalyst 34 and the exhaust gas after thermal equilibrium are Tm. Then, thermal equilibrium formula is represented by the following formula (3).

$$Ef + Ec = Ga \times Tm \times Cg + Mc \times Tm \times Cc \quad (3)$$

This temperature Tm is a basic value of the estimation temperature of the NOx catalyst 34. However, in an actual case, the exhaust gas and the NOx catalyst 34 do not always reach a complete thermal equilibrium status. The exhaust gas of the temperature Tr is emitted to the downstream side of the NOx catalyst 34 to cause thermal energy to escape. Thus, based on the temperature Tr, thermal energy Er escaped to the downstream side is calculated to thereby subject the basic estimation temperature Tm of the NOx catalyst 34 to a feedback compensation, thereby calculating a finally-estimated catalyst temperature.

As can be understood from the above description, in this embodiment, the pre catalyst exhaust temperature Tf, which is an NOx catalyst upstream-side exhaust gas temperature, is detected by the pre catalyst exhaust temperature sensor 52. The post catalyst exhaust temperature Tr, which is an NOx catalyst downstream-side exhaust gas temperature, is detected by the post catalyst exhaust temperature sensor 54. Then, the intake air amount Ga that may be considered as being equivalent to the exhaust gas amount is detected by the airflow meter 22. Based on these detection values, the ECU 100 estimates the catalyst temperature Tc of the NOx catalyst 34.

On the other hand, the addition of urea to the NOx catalyst 34 is controlled by the ECU 100 based on the estimated catalyst temperature Tc. Although the details will be described later, the urea addition is carried out when the estimated catalyst temperature Tc reaches a predetermined addition start temperature Tcst (e.g., about 200 degrees C.) or more at which the NOx catalyst 34 is active. The urea addition is stopped when the estimated catalyst temperature Tc is lower than the addition start temperature Tcst. The reason is that no NOx can be reduced prior to the activation of the NOx catalyst. The urea addition is also stopped when the estimated catalyst temperature Tc is equal to or higher than a predetermined upper limit temperature $T_{max}$ (e.g., about 600 degrees C.) much higher than the addition start temperature Tcst. The reason is that NOx cannot be efficiently reduced even when the urea addition is performed in this case also. However, a diesel engine generally has an exhaust temperature lower than that of a gasoline engine. Thus, the catalyst temperature reaches such an upper limit temperature in a relatively few cases. When the catalyst temperature Tc is equal to or higher than the addition start temperature Tcst and is lower than the upper limit temperature Tmax, the urea addition is performed. When the catalyst temperature Tc is not within this temperature range, the urea addition is stopped.

It is noted that, during engine warm up, while the NOx catalyst 34 has a rising temperature due to the exhaust heat from the engine, the post catalyst NOx sensor 50 has a rising temperature relatively early due to the heating of a built-in heater. Thus, the NOx catalyst 34 is generally activated earlier than the post catalyst NOx sensor 50. The ECU 100 senses the impedance of the post catalyst NOx sensor 50 and controls the heater so that this impedance has a predetermined value corresponding to the active temperature of the post catalyst NOx sensor 50.

Next, the following section will describe an abnormality diagnosis of the NOx catalyst 34.

Generally, abnormality diagnosis for the NOx catalyst 34 in this embodiment is characterized in that, at a timing at which the NOx catalyst 34 has a relatively-low activation level and a timing at which the NOx catalyst 34 has a relatively-high activation level, index values regarding the NOx clarification capacity of the NOx catalyst 34 are measured respectively to determine, based on these measured index values, an abnormality of the NOx catalyst 34. Here, the NOx catalyst activation level can be represented by a catalyst temperature that is the correlation value thereof. As an index value regarding the NOx clarification capacity of the NOx catalyst 34, an NOx clarification rate is used in this embodiment. However, these values also can be other values.

At a timing at which the NOx catalyst 34 has a relatively-low activation level and a timing at which the NOx catalyst 34 has a relatively-high activation level, there is a difference or change in the NOx clarification rate of the NOx catalyst 34. These differences or change amounts change depending on the deterioration level of the NOx catalyst 34. Thus, by determining the difference or the magnitude of the change amount, whether the NOx catalyst 34 is normal or abnormal can be determined. In particular, this determination uses a measured value of an NOx clarification rate at a timing at which the NOx catalyst 34 has a relatively-low activation level (in other words, at a timing at which the catalyst temperature does not still sufficiently reach an active temperature range). At such a timing, even when reducing agent is added, the NOx catalyst 34 originally does not have a sufficient NOx clarification capacity. Thus, by using a measured value of an NOx clarification rate at this timing, the need as in Japanese Patent Application Laid-Open No. H11-93647 (1999) for example can be avoided where a status having a low NOx clarification capacity is intentionally created in spite of the fact that the NOx catalyst 34 has a high activation level. Thus, an abnormality diagnosis can be carried out without intentionally deteriorating the emission.

The NOx clarification rate R of the NOx catalyst 34 is represented by R=N2/N1 when assuming that the catalyst upstream-side NOx amount flowing into the NOx catalyst 34 is N1 and the catalyst downstream-side NOx amount emitted from the NOx catalyst 34 is N2. The catalyst downstream-side NOx amount N2 is calculated by the ECU 100 based on the post catalyst NOx concentration Cr detected by the post catalyst NOx sensor 50.

On the other hand, the catalyst upstream-side NOx amount N1 in this embodiment has a value estimated by the ECU 100. Specifically, the ECU 100 calculates the catalyst upstream-side NOx amount N1 as an estimation value based on a detection value of a parameter representing an engine operation status (e.g., detection values of an engine rotation speed NE and an accelerator opening AC) and in accordance with a predetermined map or function. Additionally or alternatively, the upstream side of the NOx catalyst 34 also may have a pre catalyst NOx sensor to calculate the catalyst upstream-side NOx amount N1 based on an NOx concentration detected by this pre catalyst NOx sensor. The catalyst upstream-side NOx amount N1 and the catalyst downstream-side NOx amount N2 thus obtained are used by the ECU 100 to calculate the NOx clarification rate R.

Figure 3:
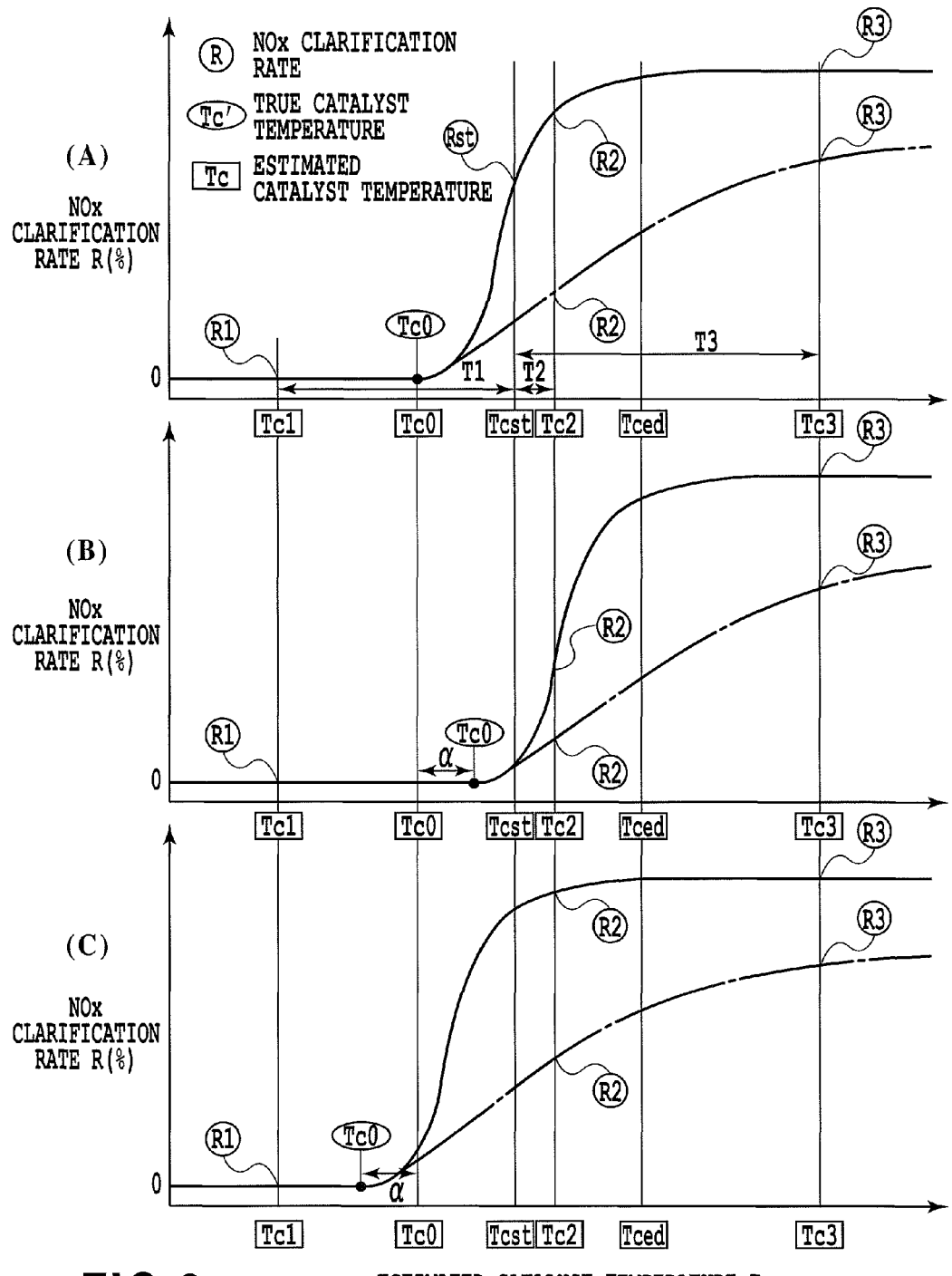
FIGS. 3(A) to 3(C) are a graph illustrating the relation between an estimated catalyst temperature and an NOx clarification rate of NOx catalyst.
Figure 4:
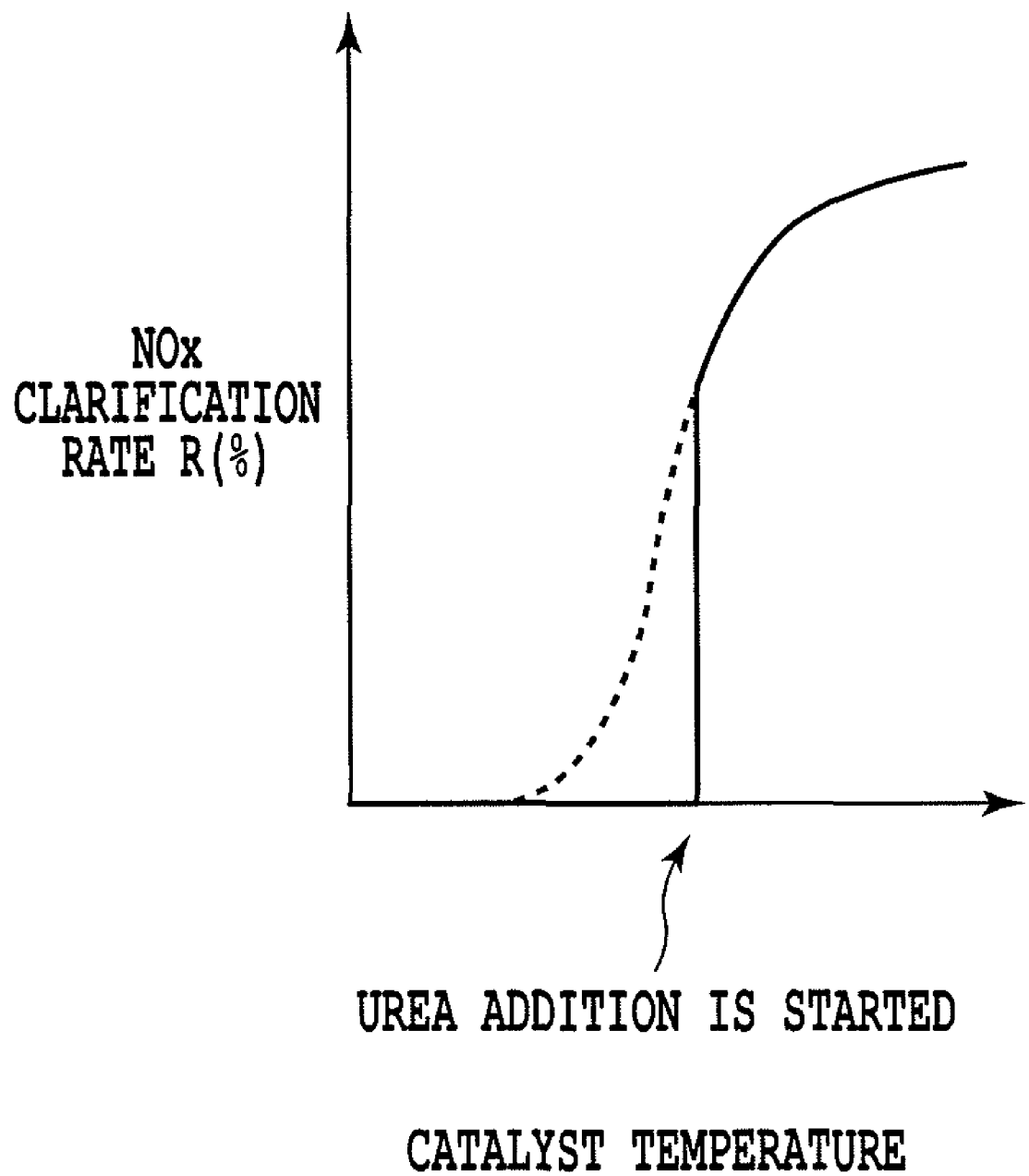
FIG. 4 is a graph illustrating an actual rising of an NOx clarification rate.

The following section will describe, with reference to FIG. 3, the details of the catalyst abnormality diagnosis in this embodiment. FIGS. 3 (A) to 3 (C) respectively show the relation between the estimated catalyst temperature Tc (horizontal axis) and the NOx clarification rate R of the NOx catalyst 34 (vertical axis). The solid line shows a case of a normal catalyst and a dashed-dotted line shows a case of an abnormal catalyst. In particular, FIGS. 3(A) to 3(C) show how the NOx catalyst is gradually activated and the NOx clarification rate gradually increases with an increase of the catalyst temperature in the warm-up process of the NOx catalyst 34. In the drawings, values surrounded by rectangular frames show estimated catalyst temperatures Tc, values surrounded by elliptical frames show true catalyst temperatures Tc', and values surrounded by circles show NOx clarification rates R. The drawings show a case where urea is always added. With an increase of the catalyst temperature, the NOx clarification rate R smoothly increases from 0 and finally converges at the maximum clarification rate depending on the catalyst deterioration level. However, an actual control is that the urea addition is started when the estimated catalyst temperature Tc reaches the predetermined addition start temperature Tcst ad the clarification rate R=0 is established prior to the start. Thus, an actual case is as shown in FIG. 4 where the NOx clarification rate R suddenly rises simultaneously with the start of the urea addition as shown by the step-like line.

As shown in FIG. 3, in the case of the normal catalyst shown by the solid line, a high NOx clarification rate R is obtained after the catalyst is activated. In the case of the abnormal catalyst shown by the dashed-dotted line on the other hand, only the NOx clarification rate R smaller than that of a normal catalyst is obtained even when the catalyst is activated.

A catalyst temperature at which the NOx catalyst 34 changes from a not-activated status to an activated status (in other words, a catalyst temperature at which the NOx clarification rate R changes from 0 to a value larger than 0) is called an activation start temperature Tc0. A catalyst temperature at which the activation of the NOx catalyst 34 is almost completed (in other words, a catalyst temperature at which the NOx clarification rate R almost converges at the maximum clarification rate) is called an activation completed temperature Tced.

FIG. 3(A) shows a case where the estimated catalyst temperature Tc is not deviated from the true catalyst temperature Tc' and is equal to the true catalyst temperature Tc'. A timing at which the estimated catalyst temperature Tc=Tc0 is established is the same as a timing at which the true catalyst temperature Tc'=Tc0 is established. On the other hand, FIG. 3 (B) and FIG. 3 (C) show a case where the estimated catalyst temperature Tc is deviated from the true catalyst temperature Tc'. FIG. 3(B) shows a case where the estimated catalyst temperature Tc is deviated than the true catalyst temperature Tc' to a lower-temperature side by $\alpha$. For example, a timing at which Tc=Tc0 is established is the same as a timing at which Tc'=Tc0−$\alpha$. The diagram itself shifts from that of FIG. 3(A) to the right side. On the other hand, FIG. 3(C) shows a case where the estimated catalyst temperature Tc is deviated from the true catalyst temperature Tc' to a higher-temperature side by $\alpha$. For example, a timing at which Tc=Tc0 is established is the same as a timing at which Tc'=Tc0+$\alpha$ is established. The diagram itself shifts from that of FIG. 3(A) to the left side by $\alpha$.

As described above, there may be a case where the estimated catalyst temperature Tc is deviated from the true catalyst temperature Tc'. As described above, the estimated catalyst temperature Tc can be calculated based on the detection values of the pre catalyst exhaust temperature sensor 52, the post catalyst exhaust temperature sensor 54, and the airflow meter 22. However, the respective detection value may be deviated from a true value due to the deterioration of the sensor for example. This may cause the estimated catalyst temperature Tc to be deviated from the true catalyst temperature Tc'.

By the way, with reference to FIG. 3(A), in the case of this embodiment, the urea addition is started when the estimated catalyst temperature Tc reaches the addition start temperature Tcst. This addition start temperature Tcst is set to such a value in advance that allows the catalyst temperature (true catalyst temperature) to be equal to or higher than the activation start temperature Tc0 and to be lower than the activation completed temperature Tced. In particular, it is advantageous for emission to start the urea addition in the warm up process as early as possible to operate the NOx catalyst as early as possible. Thus, such a control is performed that changes the addition start temperature Tcst to the lower-temperature side as much as possible. This point will be described later.

For the abnormality diagnosis of the NOx catalyst, when the estimated catalyst temperature Tc reaches the predetermined value Tc1, the first NOx clarification rate R1 is measured. This measurement timing is called the first timing and the predetermined value Tc1 is called the first predetermined value. In the case of this embodiment, the first timing is set to a timing at which the estimated catalyst temperature Tc is lower than the predetermined activation start temperature Tc0 (i.e., a timing at which the NOx clarification rate R is 0). The first predetermined value Tc1 is determined based on a changeable addition start temperature Tcst as a criterion and is determined as Tc1=Tcst−T1 (T1 is a predetermined fixed value such as 30 degrees C.). The first predetermined value Tc1 is determined so that the NOx clarification rate R at the first timing is still 0 even when the dispersion of the catalyst temperature estimation value Tc is considered.

It is noted that the first timing also may be alternatively set to a timing at which the estimated catalyst temperature Tc is equal to or higher than the activation start temperature Tc0 (e.g., a timing at which the estimated catalyst temperature Tc is slightly higher than the activation start temperature Tc0 (i.e., a timing at which the NOx clarification rate is slightly higher than 0)).

Next, when the estimated catalyst temperature Tc reaches the predetermined value Tc2, the second NOx clarification rate R2 is measured. This timing is called the second timing. The predetermined value Tc2 is called the second predetermined value (Tc2>Tc1). In the case of this embodiment, the second timing is set to a timing at which the estimated catalyst temperature Tc is equal to or higher than the changeable addition start temperature Tcst and is lower than the predetermined activation completed temperature Tced. In other words, the second timing is set to a timing at which the NOx clarification rate R2 is equal to or higher than the NOx clarification rate Rst at the start of the urea addition and is lower than the maximum clarification rate. This second predetermined value Tc2 is also determined based on the changeable addition start temperature Tcst as a criterion and is determined as Tc2=Tcst+T2 (T2 is a predetermined fixed value such as 30 degrees C.).

In this way, the NOx clarification rates R1 and R2 are measured at the first timing at which the NOx catalyst 34 has a relatively-low activation level and at the second timing at which the NOx catalyst 34 has a relatively-high activation level. Then, basically, when a difference between these clarification rates of ΔR12=R2−R1 is compared with the predetermined value ΔR12s and the difference ΔR12 is larger than the predetermined value ΔR12s, the catalyst can be determined as normal (see the solid line in the drawing) and the catalyst can be determined as abnormal when the difference ΔR12 is equal to or lower than the predetermined value ΔR12s (see the dashed-dotted line in the drawing). It is noted that the calculation of the difference as described above is advantageous in that the sensor offset dispersion can be absorbed.

By the way, when an estimated catalyst temperature is deviated, this method only is not always sufficient to accurately determine whether the catalyst is normal or abnormal. Specifically, as shown in FIG. 3 (B), when the estimated catalyst temperature Tc is deviated from the true catalyst temperature Tc' to the lower-temperature side, the NOx clarification rate R2 at the second timing (Tc=Tc2) is apparently reduced to cause a reduced difference ΔR12 from the NOx clarification rate R1 at the first timing (Tc=Tc1), which may consequently cause a possibility where the catalyst is falsely determined as abnormal even when the catalyst is normal.

To prevent this, in this embodiment, the NOx clarification rate R3 is calculated also at the third timing at which the estimated catalyst temperature Tc reaches the third predetermined value Tc3 (Tc3>Tc2). The third timing is set to a timing at which the estimated catalyst temperature Tc is equal to or higher than the activation completed temperature Tced and is set, in other words, to a timing at which the NOx clarification rate R is close to the maximum clarification rate. The third predetermined value Tc3 is also determined based on the changeable addition start temperature Tcst as a criterion and is determined as Tc3=Tcst+T3 (T3 is a predetermined fixed value such as 60 degrees C.).

This third timing is in sufficiently high temperature side so as to eliminate the influence by the deviation of the estimation of a catalyst temperature. At this third timing, a normal catalyst (see the solid line in the drawing) and an abnormal catalyst (see the dashed-dotted line in the drawing) have therebetween a clear difference in the NOx clarification rate R3. When the difference in the NOx clarification rate ΔR12 between the first timing and the second timing is equal to or lower than the predetermined value ΔR12s, the difference ΔR13 between the NOx clarification rates R1 and R3 (=R3−R1) between the first timing and the third timing is calculated. Then, this difference ΔR13 is compared with the predetermined value ΔR13s. When the difference ΔR13 is larger than the predetermined value ΔR13s, then the catalyst is finally determined as normal. When the difference ΔR13 is equal to or lower than the predetermined value ΔR13s, the catalyst is finally determined as abnormal.

By the way, as shown in FIG. 3 (c), when the estimated catalyst temperature Tc is deviated from the true catalyst temperature Tc' to the higher-temperature side, the NOx clarification rate R2 at the second timing (Tc=Tc2) increases when compared to a case where there is no deviation of estimation (FIG. 3 (A)). Thus, the difference ΔR12 from the NOx clarification rate R1 at the first timing (Tc=Tc1) also increases. Thus, the catalyst is correctly determined as normal and thus there is no particular problem. What should be acknowledged as a problem is that a case where the estimated catalyst temperature Tc as shown in FIG. 3 (B) is deviated from the true catalyst temperature Tc' to the lower-temperature side.

Figure 5:
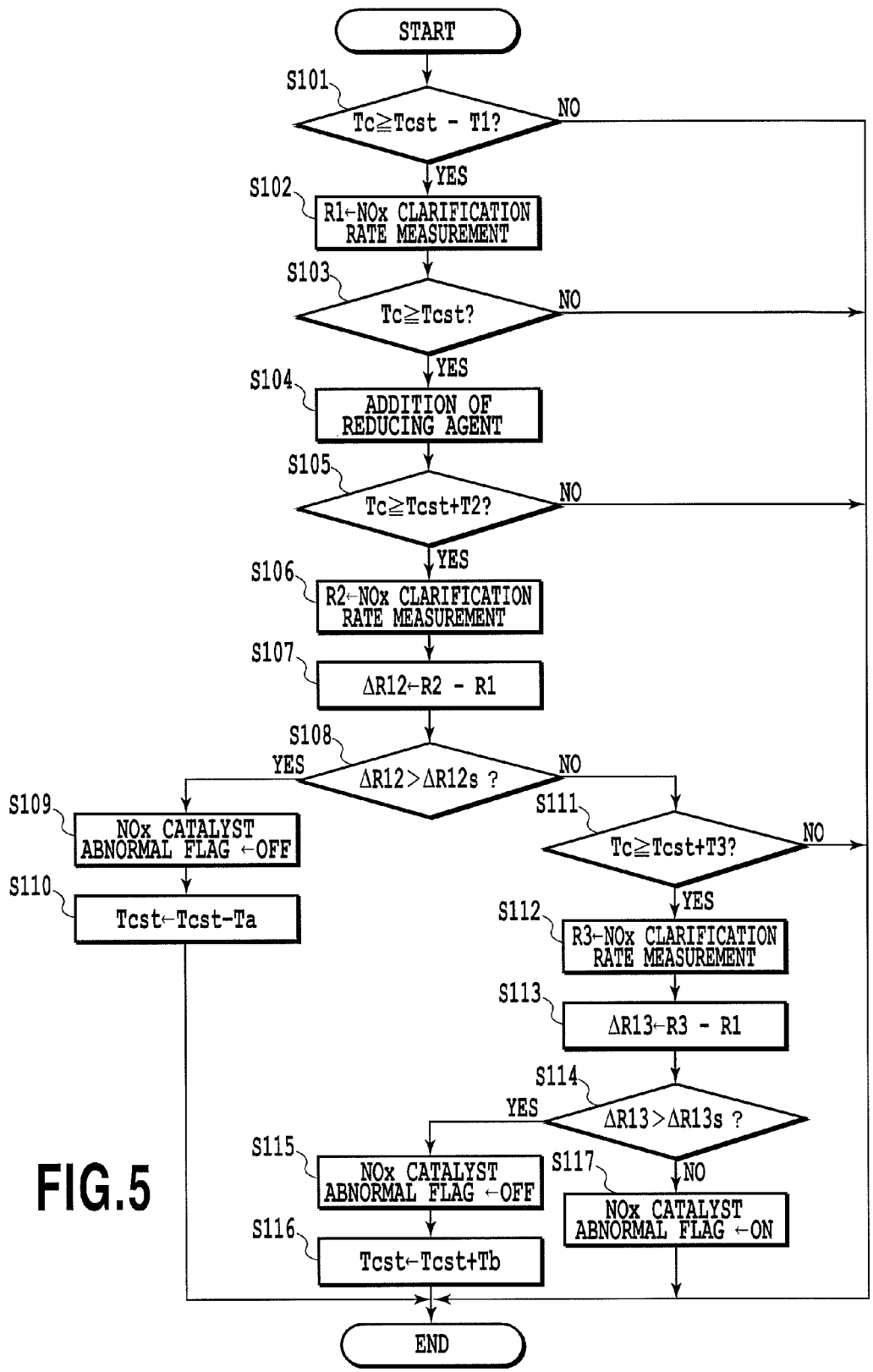
FIG. 5 is a flowchart of an abnormality diagnosis processing.

Next, the following section will describe a processing for carrying out the abnormality diagnosis as described above with reference to FIG. 5. The shown routine is carried out by the ECU 100 with a predetermined cycle (e.g., 16 msec).

In the first step S101, whether the current time reaches the first timing or not (specifically, whether the estimated catalyst temperature Tc reaches a value equal to or higher than the first predetermined value Tc1 (=Tcst−T1)) is judged. When it is judged that the current time does not reach the first timing, then this routine is completed. When it is judged that the current time reaches the first timing on the other hand, the NOx clarification rate is measured step S102 and the measured value is stored as R1. In this embodiment, R1=0(%) is established.

Next, in step S103, whether the current time reaches the urea addition start timing or not (specifically, whether the estimated catalyst temperature Tc reaches a value equal to or higher than the addition start temperature Tcst or not) is judged. When it is judged that the current time does not reach the urea addition start timing, this routine is completed. When it is judged that the current time reaches the urea addition start timing on the other hand, the addition of urea (reducing agent) is started in step S104.

Next, in step S105, whether the current time reaches the second timing or not (specifically, whether estimated catalyst temperature Tc reaches a value equal to or higher than the second predetermined value Tc2 (=Tcst+T2) or not) is judged. When it is judged that the current time does not reach the second timing, this routine is completed. When it is judged that the current time reaches the second timing on the other hand, the NOx clarification rate is measured in step S106 and the measured value is stored as R2.

Thereafter, in step S107, a difference ΔR12 (=R2−R1) in the NOx clarification rate between the first timing and the second timing is calculated. Then, in step S108, the difference ΔR12 is compared with the predetermined value ΔR12s.

When the difference ΔR12 is larger than the predetermined value ΔR12s, it is determined in step S109 that the NOx catalyst is normal and an NOx catalyst abnormal flag is off. Then, the processing proceeds to step S110 where a predetermined fixed value Ta (e.g., 1 degrees C.) is deducted from the current addition start temperature Tcst. Then, the result is stored as a new addition start temperature Tcst. As a result, the addition start temperature Tcst is changed or updated to a value closer to the lower-temperature side and the start of the urea addition and the timing at which the catalyst starts to operate are accelerated, thereby consequently improving emission (emission after start in particular). In this manner, this routine is completed. When the addition start temperature Tcst is changed by Ta as described above, the first to third predetermined values Tc1 to Tc3 defining the first to third timings are also changed by Ta. When this step S110 is carried out repeatedly, the addition start temperature Tcst is gradually moved to the lower-temperature side by the predetermined value Ta.

On the other hand, when the difference ΔR12 is equal to or lower than the predetermined value ΔR12s in step S108, there is a possibility where the NOx catalyst may be abnormal. However, there is another possibility of a deviated catalyst temperature estimation. Thus, the processing avoids to immediately determine an abnormality and proceeds to step S111. In step S111, whether the current time reaches the third timing or not (specifically, whether the estimated catalyst temperature Tc reaches a value equal to or higher than the third predetermined value Tc3 (=Tcst+T3) or not) is judged. When it is judged that the current time does not reach the third timing, this routine is completed. When it is judged that the current time reaches the third timing on the other hand, the NOx clarification rate is measured in step S112. The measured value is stored as R3.

Thereafter, in step S113, the difference ΔR13 (=R3−R1) in the NOx clarification rate between the first timing and the third timing is calculated. Then, in step S114, the difference ΔR13 is compared with the predetermined value ΔR13s.

When the difference ΔR13 is larger than the predetermined value ΔR13s, the NOx catalyst is determined as normal in step S115 and the NOx catalyst abnormal flag is turned off. Specifically, the reason why the difference ΔR12 in the NOx clarification rate between the first timing and the second timing was small was not due to an abnormal NOx catalyst but mainly due to the deviated catalyst temperature estimation to thereby finally determine that the NOx catalyst is normal.

Then, the processing proceeds to step S116 where a predetermined fixed value Tb (e.g., 5 degrees C.) from the current addition start temperature Tcst is added and the result is stored as a new addition start temperature Tcst. As a result, the addition start temperature Tcst is changed or updated to a value closer to a higher temperature side. The reason of this is as follows. When the addition start temperature Tcst is gradually moved to the lower-temperature side as in step S110, the second predetermined value Tc2 is also moved to the lower-temperature side to cause the reduced NOx clarification rate R2 at the second timing, which causes a reduced difference ΔR12 in the NOx clarification rate between the first and second timings. Specifically, the addition start temperature Tcst excessively deviated to the lower-temperature side causes an excessively-small clarification rate difference ΔR12, which causes a risk where an abnormality is falsely determined. The addition start temperature Tcst excessively deviated to the lower-temperature side on the other hand causes the reducing agent to be added while the NOx catalyst having an insufficient NOx clarification capacity, which causes a risk where unreacted reducing agent passes through the catalyst. In order to avoid the situation as described above, the addition start temperature Tcst is changed to a value closer to a higher temperature side. As in this embodiment, the step width Tb of the addition start temperature Tcst to the higher-temperature side is preferably larger than a step width Ta to the lower temperature side. The reason is that this allows the movement of the addition start temperature Tcst to the lower temperature side to be performed minutely and gradually and also allows, when the addition start temperature Tcst is excessively deviated to the lower temperature side, the addition start temperature Tcst to be immediately returned to the higher-temperature side. It is noted, when the addition start temperature Tcst is changed by Tb to the higher-temperature side, the first to third predetermined values Tc1 to Tc3 defining the first to third timings are also changed by Tb to the higher-temperature side. When the execution of step S116 is completed in this manner, this routine is completed.

On the other hand, in step S114, when the difference ΔR13 is equal to or lower than the predetermined value ΔR13s, the NOx catalyst is determined to be abnormal in step S117 and the NOx catalyst abnormal flag is turned on. Specifically, only when the clarification rate difference ΔR13 is small even at the third timing, the NOx catalyst is determined as abnormal, thereby resulting in the final determination that the NOx catalyst is abnormal. In this manner, this routine is completed.

As described above, according to the abnormality diagnosis of this embodiment, an abnormality of the NOx catalyst can be determined in distinction from the deviated estimation of the catalyst temperature, thus improving the reliability of the abnormality diagnosis. Furthermore, since the timing at which the NOx catalyst starts the NOx clarification (i.e., the timing at which the urea addition is started) can be gradually moved to the lower-temperature side, it is very advantageous for the improvement of emission (in particular, the improvement of cold emission after the start of the engine). Generally, the timing at which the addition of the reducing agent is started is set to the safe side (i.e., a fixed value at the higher-temperature side) in consideration of various dispersions such as a sensor error. However, in the case of this embodiment, the timing at which the addition of the reducing agent is started can be adjusted to an optimal timing depending on an individual case. Furthermore, if the timing is excessively moved to the lower-temperature side, the timing can be returned to the higher-temperature side. Thus, the timing can be prevented from being excessively moved and the excessive movement can be distinct from abnormal catalyst, thus improving the reliability of the catalyst abnormality diagnosis. In addition, since the abnormality diagnosis can be performed during the warm up of the engine and NOx catalyst, an advantage can be provided in that the diagnosis frequency can be secured.

As will be understood from the above description, in this embodiment, NOx clarification rate measurement means is composed of the post catalyst NOx sensor 50, the ECU 100, the accelerator opening sensor 27, and the crank angle sensor 26. Abnormality determination means is composed of the ECU 100. Catalyst temperature estimation means is composed of the ECU 100, the accelerator opening sensor 27, and the crank angle sensor 26. Reducing agent addition control means is composed of the addition valve 40, the supply apparatus 42, and the ECU 100.

As described above, the embodiment of the present invention has been described. However, the present invention can be applied to other embodiments. For example, reducing agent may be made of substances other than urea, including, for example, ammonia, hydrocarbon (HC), alcohol, hydrogen, or carbon monoxide.

In the embodiment, the first abnormality determination is performed based on the NOx clarification rate R1 at the first timing and the NOx clarification rate R2 at the second timing and, when there is a possibility where the result may be abnormal, the final abnormality determination is performed based on the NOx clarification rate R1 at the first timing and the NOx clarification rate R3 at the third timing. However, the invention is not limited to this. For example, the abnormality determination also may be performed based on the NOx clarification rate R1 at the first timing and the NOx clarification rate R3 at the third timing. Furthermore, the catalyst activation level (catalyst temperature) at the first timing is preferably the same as in the embodiment between a case where a comparison is made between the first timing and the second timing and a case where a comparison is made between the first timing and the third timing. However, the catalyst activation level (catalyst temperature) at the first timing does not always have to be the same and also may be different.

In the embodiment, a difference in the NOx clarification rate between the respective timings was compared with a predetermined value to perform the abnormality determination. However, a comparison method is not limited to this. For example, a ratio between NOx clarification rates at the respective timings also may be compared with a predetermined value to perform the abnormality determination.

The present invention also can be applied to such storage reduction NOx catalyst that stores NOx in exhaust gas when the exhaust gas flowing therein has an excessive oxygen concentration (lean) and that emits the stored NOx when the exhaust gas flowing therein has a thin oxygen concentration (rich). In this case, the timing at which the NOx clarification by the NOx catalyst is started mainly depends on the catalyst temperature. Thus, the control of the NOx clarification start timing as in the above embodiment (steps S110 and S116) cannot be performed. However, an abnormality of the NOx catalyst can be still determined based on the NOx clarification rate at a timing at which the catalyst activation level is relatively low and a timing at which the catalyst activation level is relatively high.

The exhaust passage also may include other exhaust clarification apparatuses such as oxidation catalyst or a diesel particulate filter (DPF). The present invention also can be applied to an internal-combustion engine other than the compression ignition-type internal combustion engine. For example, the invention also can be applied to a spark-ignited internal combustion engine (in particular, a direct-injection lean burn gasoline engine).

The embodiment of the present invention is not limited to the above-described embodiment. The present invention includes any modifications, applications, and equivalents included in the concept of the present invention defined by the claims. Thus, the present invention should not be interpreted in a limited manner and can be applied to any other techniques within the scope of the concept of the present invention.

Industrial Applicability

The present invention can be applied to NOx catalyst provided in an exhaust passage of an internal-combustion engine.

The invention claimed is:

1. An abnormality diagnosis apparatus for an NOx catalyst, comprising:
    NOx catalyst provided in an exhaust passage of an internal-combustion engine;
    measurement means for measuring an index value regarding an NOx clarification capacity of the NOx catalyst; and
    abnormality determination means for determining an abnormality of the NOx catalyst based on an index value measured by the measurement means at a timing at which the NOx catalyst has a relatively-low activation level and an index value measured by the measurement means at a timing at which the NOx catalyst has a relatively-high activation level, wherein,
    the timing at which the NOx catalyst has a relatively-low activation level consists of a first timing,
    the timing at which the NOx catalyst has a relatively-high activation level consists of a second timing having a higher catalyst activation level than that of the first timing and a third timing having a higher catalyst activation level than that of the second timing, and
    the abnormality determination means determines, when a change amount between an index value measured at the first timing and an index value measured at the second timing is equal to or lower than a predetermined value, an abnormality of the NOx catalyst based on a change amount between the index value measured at the first timing and an index value measured at the third timing.

2. The abnormality diagnosis apparatus for an NOx catalyst according to claim 1, further comprising:
    a catalyst temperature estimation means for estimating a catalyst temperature of the NOx catalyst; and
    a reducing agent addition control means for controlling an addition of reducing agent to the NOx catalyst based on the catalyst temperature estimated by the catalyst temperature estimation means, wherein,
    the reducing agent addition control means changes, when the change amount between the index value measured at the first timing and the index value measured at the second timing is larger than a predetermined value, a catalyst temperature for starting the addition of the reducing agent to a lower-temperature side.

3. The abnormality diagnosis apparatus for an NOx catalyst according to claim 2, wherein,
    the reducing agent addition control means changes, when a change amount between the index value measured at the first timing and an index value measured at the third timing is larger than a predetermined value, a catalyst temperature for starting the addition of the reducing agent to a higher-temperature side.

4. The abnormality diagnosis apparatus for an NOx catalyst according to claim 1, wherein,
    the timing at which the NOx catalyst has a relatively-low activation level is a timing at which a catalyst temperature is lower than an activation start temperature and the timing at which the NOx catalyst has a relatively-high activation level is a timing at which the catalyst temperature is equal to or higher than the activation start temperature.

5. The abnormality diagnosis apparatus for an NOx catalyst according to claim 1, wherein,
    the first timing is a timing at which a catalyst temperature is lower than an activation start temperature, the second timing is a timing at which the catalyst temperature is equal to or higher than the activation start temperature and is lower than an activation completed temperature, and the third timing is a timing at which the catalyst temperature is equal to or higher than the activation completed temperature.

6. The abnormality diagnosis apparatus for an NOx catalyst according to claim 1, wherein,
    the index value is an NOx clarification rate.

7. A method for diagnosing an abnormality of NOx catalyst provided in an exhaust passage of an internal-combustion engine, comprising:
    a step of measuring an index value regarding a clarification capacity of the NOx catalyst at a timing at which the NOx catalyst has a relatively-low activation level;
    a step of measuring the index value at a timing at which the NOx catalyst has a relatively-high activation level; and
    a step of determining an abnormality of the NOx catalyst based on these measured index values, wherein,
    the timing at which the NOx catalyst has a relatively-low activation level consists of a first timing, the timing at which the NOx catalyst has a relatively-high activation level consists of a second timing having a higher catalyst activation level than that of the first timing and a third timing having a higher catalyst activation level than that of the second timing, and the abnormality determination step determines, when a change amount between an index value measured at the first timing and an index value measured at the second timing is equal to or lower than a predetermined value, an abnormality of the NOx catalyst based on a change amount between the index value measured at the first timing and an index value measured at the third timing.

8. The abnormality diagnosis method for NOx catalyst according to claim 7, further comprising:

a step of estimating a catalyst temperature of the NOx catalyst; and a step of controlling an addition of reducing agent to the NOx catalyst based on this estimated catalyst temperature, wherein, the reducing agent addition control step changes, when the change amount between the index value measured at the first timing and the index value measured at the second timing is larger than a predetermined value, a catalyst temperature for starting the addition of the reducing agent to a lower-temperature side.

9. The abnormality diagnosis method for NOx catalyst according to claim 8, wherein, the reducing agent addition control step includes changing, when a change amount between the index value measured at the first timing and an index value measured at the third timing is larger than a predetermined value, a catalyst temperature for starting the addition of the reducing agent to a higher-temperature side.

10. The abnormality diagnosis method for NOx catalyst according to claim 7, wherein, the timing at which the NOx catalyst has a relatively-low activation level is a timing at which a catalyst temperature is lower than an activation start temperature and the timing at which the NOx catalyst has a relatively-high activation level is a timing at which the catalyst temperature is equal to or higher than the activation start temperature.

11. The abnormality diagnosis method for NOx catalyst according to claim 7, wherein, the first timing is a timing at which a catalyst temperature is lower than an activation start temperature, the second timing is a timing at which the catalyst temperature is equal to or higher than the activation start temperature and is lower than an activation completed temperature, and the third timing is a timing at which the catalyst temperature is equal to or higher than the activation completed temperature.

12. The abnormality diagnosis method for NOx catalyst according to claim 7, wherein, the index value is an NOx clarification rate.

* * * * *